(12) United States Patent
Sievers et al.

(10) Patent No.: US 8,525,367 B2
(45) Date of Patent: Sep. 3, 2013

(54) CONTROL UNIT AND METHOD FOR CONTROLLING PASSENGER-PROTECTION MEANS FOR A VEHICLE

(75) Inventors: Falko Sievers, Reutlingen (DE); Hartmut Schumacher, Freiberg (DE); Rainer Gschwind-Schilling, Weissach-Flacht (DE); Reiner Fuerst, Korntal-Muenchingen (DE); Carsten List, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 12/811,320

(22) PCT Filed: Nov. 19, 2008

(86) PCT No.: PCT/EP2008/065783
§ 371 (c)(1),
(2), (4) Date: Jun. 30, 2010

(87) PCT Pub. No.: WO2009/083335
PCT Pub. Date: Jul. 9, 2009

(65) Prior Publication Data
US 2010/0283320 A1 Nov. 11, 2010

(30) Foreign Application Priority Data
Jan. 3, 2008 (DE) .......................... 10 2008 003 080

(51) Int. Cl.
*B60L 1/00* (2006.01)
*B60L 3/00* (2006.01)
*H02G 3/00* (2006.01)

(52) U.S. Cl.
USPC ......................................................... 307/9.1

(58) Field of Classification Search
USPC ................... 307/9.1, 10.1; 361/103
See application file for complete search history.

(56) References Cited

U.S. PATENT DOCUMENTS

| 2002/0140293 A1 | 10/2002 | Rothleitner et al. |
| 2002/0140410 A1 | 10/2002 | Rothleitner et al. |
| 2004/0120382 A1* | 6/2004 | Bennett et al. .................. 374/45 |

FOREIGN PATENT DOCUMENTS

| DE | 44 47 174 | 3/1996 |
| DE | 10 2004 018261 | 11/2005 |
| DE | 10 2004 060296 | 6/2006 |
| DE | 10 2005 031 085 | 1/2007 |
| JP | 2004-274911 | 9/2004 |
| WO | WO 2006/058800 | 6/2006 |

* cited by examiner

*Primary Examiner* — Carlos Amaya
(74) *Attorney, Agent, or Firm* — Kenyon & Kenyon LLP

(57) ABSTRACT

A method and a control unit are provided for controlling a passenger-protection arrangement for a vehicle, at least one switching converter being used to convert voltage. A modifying circuit is provided for the at least one switching converter, the switching converter being disposed on an integrated circuit. The modifying circuit determines a thermal load as a function of at least one physical parameter for the integrated circuit. Rise and/or fall times of at least one output signal of the at least one switching converter are modified as a function of this thermal load.

13 Claims, 3 Drawing Sheets

CONTROL UNIT AND METHOD FOR CONTROLLING PASSENGER-PROTECTION MEANS FOR A VEHICLE

FIELD OF THE INVENTION

The present invention relates to a control unit and a method for controlling a passenger-protection arrangement for a vehicle.

BACKGROUND INFORMATION

In the case of a control unit for passenger protection, it is already discussed in the German Patent 10 2005 031 085 A1 to provide switching converters which charge an energy reserve to an energy-supply voltage markedly above the battery voltage, and step-down converters which convert the energy-supply voltage down again for voltages which are needed in the control unit. These converters usually take the form of switching converters.

SUMMARY OF THE INVENTION

In contrast, the control unit of the present invention and the method of the present invention for controlling a passenger-protection arrangement for a vehicle having the features set forth in the independent patent claims have the advantage that, due to a higher thermal load, by influencing the rise times and fall times of the output signal of the at least one switching converter, an electromagnetic emission of this switching converter may be reduced. Accordingly, a "balance" may be achieved between thermal load and emission. The electromagnetic compatibility of the control unit according to the present invention is therefore improved. This may take effect particularly beneficially in the reception range for radios in vehicles, so that interference in the radio reception due to the emission from such switching converters is reduced. For example, such a radio range is the VHF range from 87.5 MHz to 108 MHz.

The control unit of the present invention and the method of the present invention avoid additional costs which would result, for instance, from static interference suppression measures such as snubber circuits or the like. In addition, such static interference suppression measures would have the further disadvantage of a general deterioration in the efficiency of the switching converter.

In the present case, the control unit is an electrical device which, as a function of sensor signals, controls the passenger-protection arrangement such as airbags and seat-belt pretensioners, but also an active passenger-protection arrangement like for an electronic stability program or braking. In this context, control means the activation of the passenger-protection arrangements.

A switching converter is understood to be a converter which, using inductors such as chokes or transformers, transforms an input voltage to a higher or lower voltage level, with low losses, especially the losses of the switching elements as well as ohmic resistances of the coil, etc. As a rule, the output voltage is smoothed by capacitors (electrolytic capacitors), as well as by nearly loss-free ceramic capacitors for higher frequency components. This switching converter is disposed on an integrated circuit, e.g., a system module which has many functions of the airbag control unit. For very low powers, the switching converter may also be set up purely capacitively with poor efficiency (charge pump).

The control unit has a modifying circuit, which may be implemented as hardware and/or software. In the case of the switching converter, this modifying circuit causes the rise time or fall time of the at least one output signal of the converter to change as a function of the thermal load of the switching converter, in order to find a balance between thermal load and emission, if necessary. How the modifying circuit may be configured exactly is derived from the dependent claims.

The physical parameter in respect to the integrated circuit is defined by the dependent claims. However, there are further possibilities.

For example, to be understood by a thermal load of the integrated circuit is the temperature at the integrated circuit.

The rise times or fall times of the at least one output signal are the times which the signal needs to rise from a low value to the desired high value or, vice versa, to fall. These rise times or fall times determine how strong the thermal load or the emission is. The shorter the rise time and/or fall time, the lower the thermal load, but the higher the frequency of the emission and vice versa.

The measures and further refinements delineated in the dependent claims permit advantageous improvements to the control unit and method, respectively, set forth in the independent patent claims for controlling the passenger-protection arrangement for a vehicle.

It is advantageous that the modifying circuit is disposed at least partially on the integrated circuit. If the modifying circuit, which evaluates the thermal load, is provided completely on the integrated circuit, then the method of the present invention may proceed completely on the integrated circuit. However, it is possible for parts of the modifying circuit to be disposed outside of this integrated circuit, and specifically, in other components of the control unit, e.g., of the processor, which may be of a microcontroller, in which case, for example, the microcontroller then measures the physical parameters, determines the thermal load of the integrated circuit, and from that, determines the modification of the rise and fall times in order to achieve an optimum for the thermal load and the emission characteristic of the integrated circuit.

The at least one switching converter has at least one switching transistor which is driven by a push/pull-gate-driver circuit. The push/pull-gate-driver circuit has a first adjustable current source for the rise time, and a second adjustable current source for the fall time. These adjustable current sources may be implemented adaptively, that is, continuously controllable or regulable. However, it is possible to use a pure driver-transistor multiple (MOSFETs, quantization) for this purpose.

Advantageously, the physical parameters are either an input voltage at the at least one switching converter and/or a switching-converter current and/or a temperature of the integrated circuit. The physical parameter is used to determine the thermal load of the integrated circuit. For a step-up converter (flyback converter), it turns out that a lower thermal load is present in the case of a high input voltage than in the case of a lower input voltage. The thermal load is determined by the magnitude of the switching-converter current, and the temperature indicates it directly.

The fact that a high thermal load is present in the case of low input voltages is because of the poor efficiency the switching converter exhibits at such low input voltages. In the case of a given output load, this is essentially a result of the increasing input current accompanied by falling input voltage because of higher ohmic losses in the switching-converter coil and the switching transistors. For higher input voltages, the efficiency improves because of the decreasing converter input current and the losses thereby diminishing in the coil and the switching transistors, and the temperature of the integrated circuit falls. For example, if the converter input voltage doubles from 5 to 10 V, then the efficiency increases to ca. 90% at converter input currents that are more than halved. Since the control unit is thermally dimensioned for a worst-case scenario, given a correspondingly lower thermal load than anticipated, according to the exemplary embodiments and/or exemplary methods of the present invention, an in turn higher thermal load is accepted to thereby reduce the emission of the at least one switching converter at the expense of the efficiency. This represents an optimum for the users of such switching converters.

Exemplary embodiments of the present invention are explained in detail in the following description with reference to the drawings.

DETAILED DESCRIPTION

Figure 1:
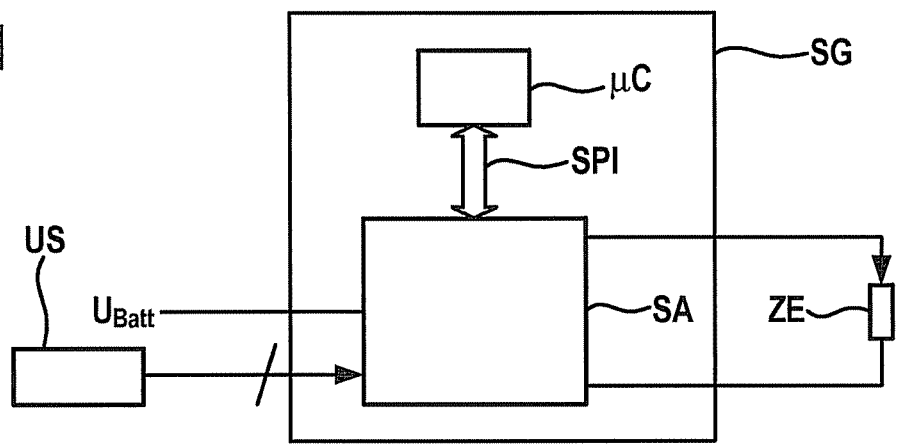
FIG. 1 shows a block diagram of the control unit according to the present invention.

FIG. 1 shows a block diagram of control unit SG of the present invention, only the components essential for the invention being shown, while other components which are necessary for the operation of the control unit but are not necessary for understanding the invention having been omitted for the sake of simplicity. For example, control unit SG has a metal and/or plastic housing, and as essential components, has a microcontroller C and a system module SA taking the form of an integrated circuit. It is possible that a plurality of such system modules SA are provided. System module SA incorporates many functions of the control unit. Among these functions is the energy supply, but also interfaces to external sensors, electrically controllable circuit breakers for the trigger circuit and, for example, also a safety controller for the parallel evaluation of the sensor signals in comparison to the microcontroller, in order to provide an independent hardware path of evaluation for the sensor signals. For instance, microcontroller C and system module SA are connected to each other via what is called the SPI (Serial Peripheral Interface) bus for the exchange of data. The system module also has watchdog functions, for example, in order to monitor microcontroller C.

Battery voltage Ubat and a switchover sensor suite US are connected to system module SA. System module SA powers control unit SG from battery voltage Ubat by converting this voltage to the level needed for the control unit. Switching converters are used for that purpose. Moreover, the system module assures that the energy reserve (not shown), usually one or more electrolytic capacitors, is charged to its voltage. A switching converter in conjunction with what is referred to as a precharger is used for this, as well. Triggering element ZE, shown here by way of example, for an airbag, for instance, is supplied with current via the trigger circuit integrated on system module SA, and is thereby triggered. Usually many trigger circuits are connected to system module SA, and not just one as shown here in simplified fashion.

The temperature of system module SA is an indicator for its efficiency at a given load. Furthermore, due to rapid switching times in the converter area of system module SA, direct electromagnetic emissions may also result, and, because of the coupling (e.g., through unavoidable substrate couplings) of the switching-converter block to other circuit blocks, an emission may occur because of the connection of these circuit blocks of system module SA to the wiring harness, like trigger circuits and sensor lines, with corresponding antenna effect. According to the present invention, the instantaneous thermal load of system module SA is determined by a modifying circuit, and it is specified to what extent the instantaneous thermal load may be further increased compared to the maximum thermal load so as, in return, to improve the emission properties of system module SA. This effect is influenced by the rise and fall times of the switching transistor or switching transistors of the switching converter.

Figure 2:
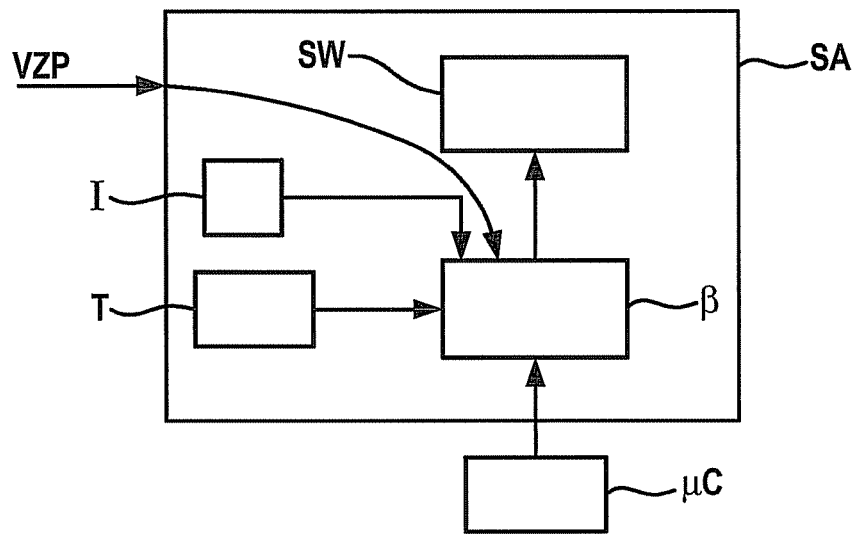
FIG. 2 shows a block diagram of a system module as the integrated circuit.

To clarify this, FIG. 2 shows a simplified block diagram of system module SA. Voltage VZP, derived from the battery voltage and applied to the switching converter, switching-converter current I and chip temperature T are fed to a modifying circuit B. It may be that only one of these variables or two of these variables is/are utilized by modifying circuit B to determine the thermal load. It is possible that microcontroller C may take over parts of this task or the entire task, and to this end, is connected to modifying circuit B and thus makes up a part of this modifying circuit.

If modifying circuit B has determined that the thermal load of system module SA as integrated circuit still offers reserves up to the maximum thermal load, then it may induce switching converter SW to set the instantaneous thermal load to the advantage of a reduced emission and therefore improved EMC properties. This is brought about by influencing the rise and fall times of the edges of the switching transistors in the switching converter.

Figure 3:
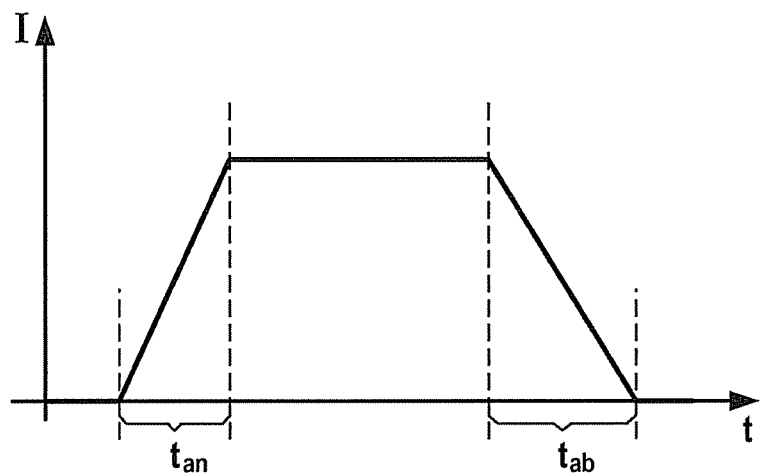
FIG. 3 shows a current/time diagram.

FIG. 3 is a current/time diagram of a current pulse which is caused by the switching transistor of the switching converter and flows through it. The current pulse has a rise time $t_{an}$ and a fall time $t_{ab}$. The length of these times essentially determines the thermal load, but also the emission characteristic of the switching converter. The shorter these times, the lower the thermal load, but the higher the frequency of the emission and the magnitude of the direct emission or the coupling into structures, whose coupling effect increases with the frequency (capacitive couplings, e.g., ASIC substrate, etc.). Conversely, the emission is reduced in response to long rise and fall times, but in return, the thermal load increases. An optimum is determined according to the present invention.

Figure 4:
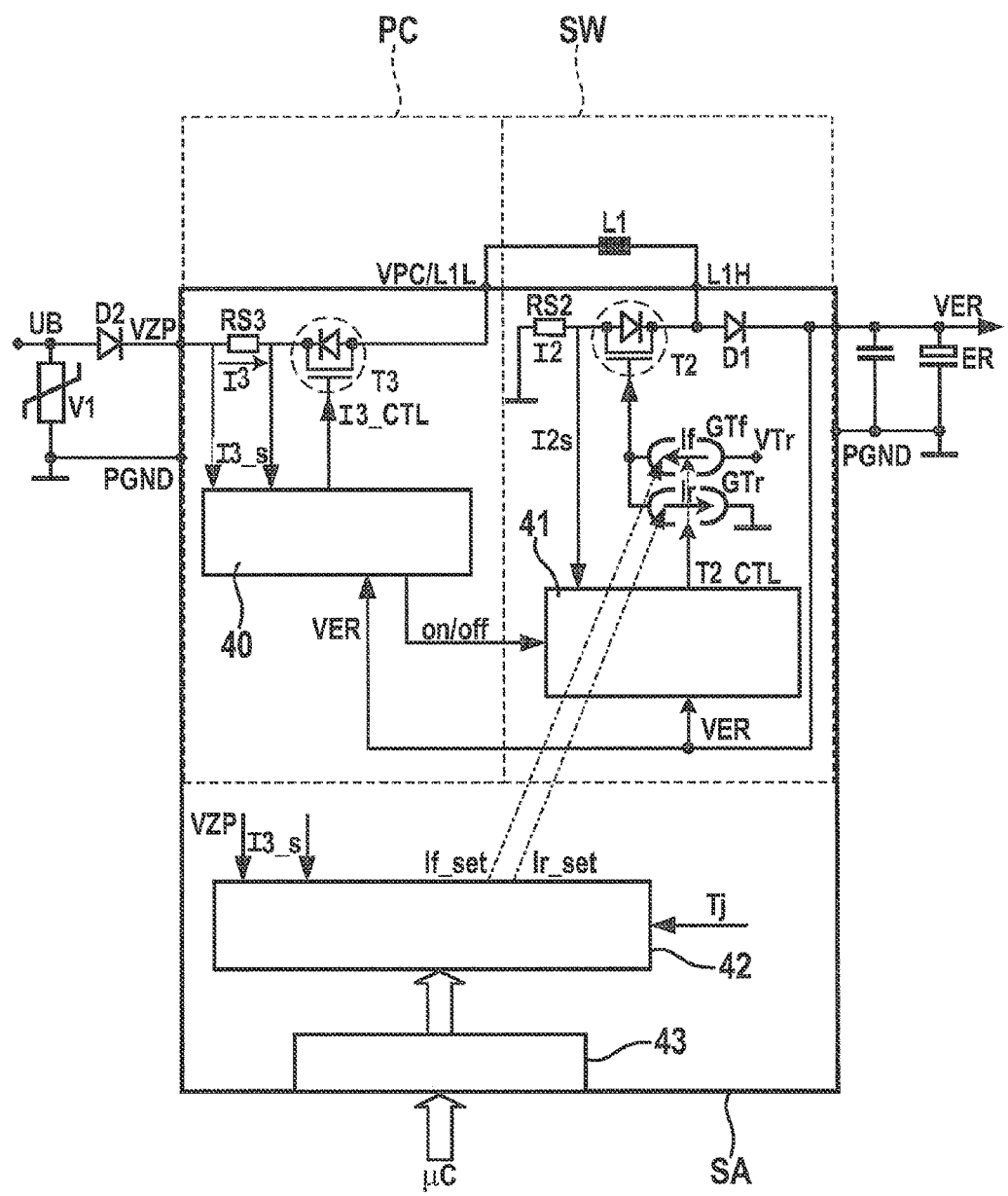
FIG. 4 shows a further block diagram with connected components of the system module as the integrated circuit.

FIG. 4 shows a block diagram of the system module according to the present invention as an integrated circuit, together with connected components with respect to the switching converter. In the present case, system module SA has a precharger PC which charges the energy reserve to approximately the level of the battery voltage VZP. In so doing, this precharger PC functions like a current source. After the charging to the battery voltage, it acts as a switch having a defined volume resistance Rdson, that is, transistor T3 of precharger PC is always switched through. Precharger PC has a series resistor RS3 which is used as a shunt resistor. Control 40 of precharger PC operates transistor T3 as a function of energy-reserve voltage VER measured at energy reserve ER. In charging mode, precharger PC, via its control 40, switches switching converter SW off. When the charging is completed, the switching converter is enabled again by precharger PC and its control 40.

In order to process input signals such as voltage VER, control 40 of the precharger has processing circuits or corresponding software; the processing circuits may be analog and/or digital. Suitable driver circuits are available to drive transistor T3 and for other signal outputs. Similar configurations are used for all, control circuits or driving circuits.

Control 40 controls transistor T3 via current I3 CTL, while current I3_S at shunt resistor RS3 is measured in order to adjust current I3, if necessary. Battery voltage VZP is protected against polarity reversal via diode D2, battery voltage UB being applied to ground across varistor V1 provided to protect against overvoltage.

Precharger PC is connected via transistor T3 by way of an output VPC/L1L to an inductor L1 of switching converter SW, so that charging current I3 of precharger PC flows across this inductor L1, an input L1H at system module SA, across a further diode D1 to energy reserve ER. This is the switching-converter current.

By way of example, in the present case, switching-converter control 41 likewise has energy-reserve voltage VER as input parameter. Step-up switching converter SW in the present case takes the form of a fixed-frequency converter. The frequency is derived from an oscillator; a PWM (pulse width modulation) controller determines the switching instants of step-up-converter transistor T2. A push/pull-gate driver GTf, GTr, made up of two adjustable current sources, is provided to drive step-up-converter transistor T2. The current which is responsible for the falling voltage edge at L1H is denoted by GTf and has the adjustable current level If. The current which is responsible for the rising voltage edge at L1H is denoted by Gtr and has the adjustable current level Ir.

The transistor is connected to ground via shunt resistor RS2, and to energy reserve ER via diode D1, as well as to L1 via input L1H. Current I2 flows to ground and is used to charge inductor L1.

Current source GTf is connected between potential VTr and the gate of transistor T2, and current source GTr is connected between the gate and ground. Current sources GTf and GTr are driven by control 41 using signal T2_CTL. Voltage VTr is a system-ASIC internal voltage (here 3.3 V) and in the case of systems starting up, is formed directly from supply voltage VZP in the ASIC, for example, by a simple Zener-diode stabilization, or in the case of a started-up system, is formed from the analog and digital voltage formed by further controllers from the energy-reserve voltage and/or VZP.

If a high current If is selected, then the voltage at the gate of T2, e.g., a MOSFET transistor, is increased quickly, and the switching speed of T2 increases. The voltage at L1H decreases rapidly, since a high −dU (voltage difference, −differential) to dt is present at L1H in the case of the falling edge.

If a high current Ir is selected, then the voltage at the gate of T2 is reduced rapidly, and the switching speed of T2 increases. The voltage at L1H rises quickly, i.e., a high dU to dt is present at L1H in the case of the rising edge.

In the following, an advantageous further refinement of the exemplary embodiments and/or exemplary methods of the present invention shown in FIG. 4 is described:

Current If is specified by If_set and current Ir is specified by Ir_set in circuit block 42 which effects an adaptive switching-speed control of step-up-converter transistor T2. An effective adaptation may already be carried out by way of the sole measurement of converter input voltage VZP. High converter input voltages VZP lead to low If and Ir current values, respectively, so that no voltage edges come about at L1H which are too fast and could result in harmful emission. Particularly in the case of such system-ASICs SA, the emission takes place because of the coupling of the switching-converter block to other circuit blocks via unavoidable substrate couplings which, based on their direct connection to the wiring harness, like trigger circuits and sensor lines, possess the correct antennas. Low converter input voltages VZP lead to higher If and Ir current values, respectively, so that the rising thermal load of system module SA is moderated toward lower input voltages VZP.

Additionally or optionally, an adaptation may be implemented via detected converter current I3. A high converter current leads to a high If and Ir current, respectively, in order to counteract the further heating of the integrated circuit. Consequently, a rapid, loss-reduced switching of T2 is then effected.

One especially effective supplementation of the voltage adaptation by VZP as a stand-alone measure is the evaluation of the temperature of integrated circuit SA. In contrast to the control via input voltage VZP, which is determined solely by the efficiency dependence of the step-up converter on voltage VZP, this also includes heating caused by other blocks of the integrated circuit. If this further heating due to other circuit blocks is not a worst-case scenario, as may be assumed in the case of a pure control via the input voltage of the switching converter, then apart from a few exceptions in the ppm (parts per million) range, the emission and consequently the interference of the switching converter for radio operation or the like may virtually be avoided without external filter measures which are static, create costs and impair the converter from the start.

The adaptive switching-speed control of step-up-converter transistor T2 may also be adapted digitally by microcontroller C via control block 43. It is possible for the microcontroller itself to measure input voltage VZP via an analog-to-digital converter, for example, and as a function of this, to bring influence to bear on the switching converter and, in so doing, the rise and fall times.

In the present case, the temperature of the integrated circuit is denoted by Tj. In the simplest case, the control by the microcontroller involves a check of threshold values, where, for example, if VZP<VZPlimit, or UB<UBlimit, the command takes place to increase currents If and Ir. However, if VZP VZPlimit or UB UBlimit, then the currents remain at a predefined value. It is possible to provide different values for the rising and falling edges. As described above, the method may also be employed in the case of step-down converters. These converters have the switching transistor in the series arm in series with the coil. This method may also be used on synchronous step-up and step-down switching converters. These converters replace the free-wheeling diode, e.g., D1 in FIG. 4, by a synchronously switched transistor T1. In this case, both transistors may undergo a corresponding adaptation of the switching speed.

Figure 5:
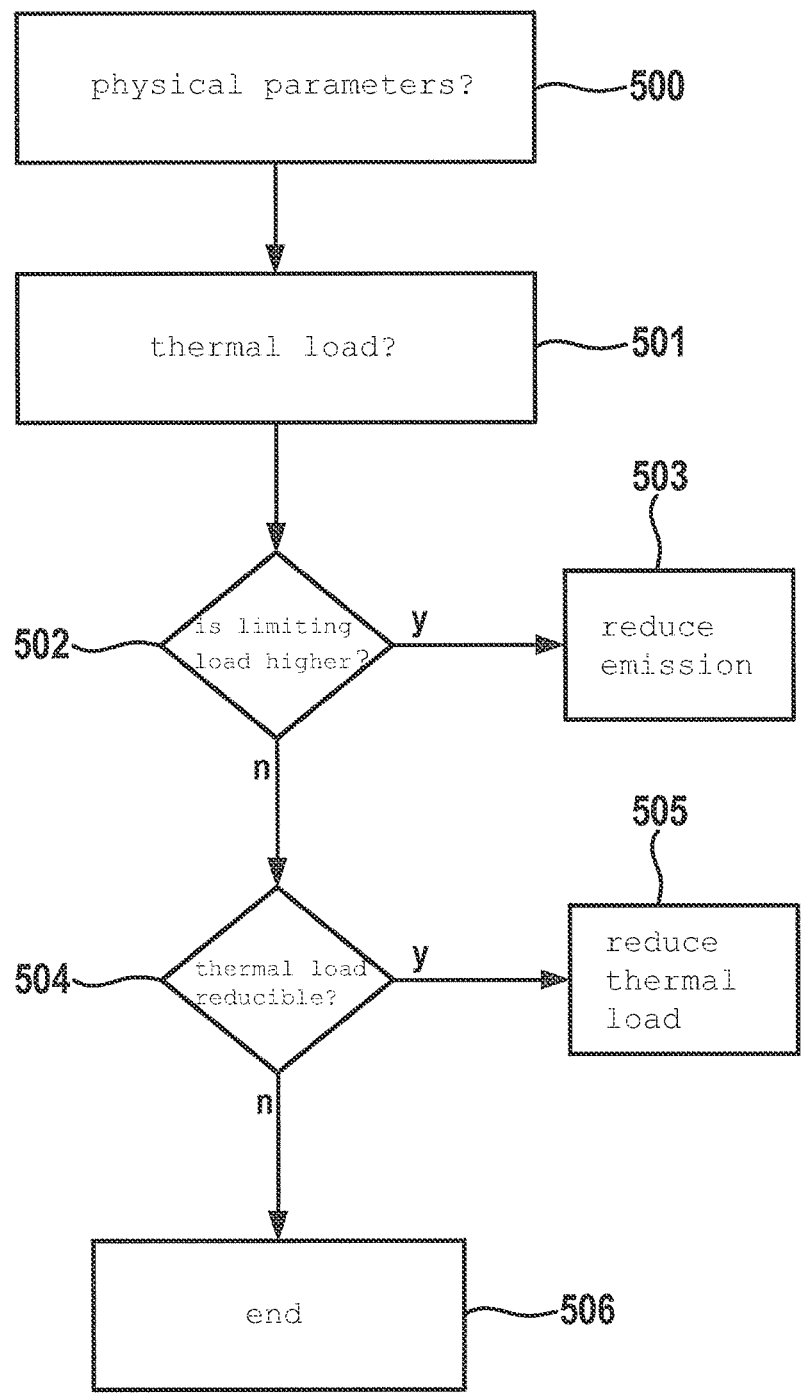
FIG. 5 shows a flow chart.

FIG. 5 is a flow chart illustrating the method according to the present invention. In method step 500, physical parameters of the integrated circuit are acquired. Such physical parameters include input voltage VZP, the switching-converter current and the temperature of the integrated circuit. This temperature may be ascertained by a suitable temperature sensor on the integrated circuit, e.g., via the temperature dependency on diodes under constant current, temperature-dependent resistors, etc.

Modifying circuit 42, 43 determines the thermal load based on at least one of these parameters. The thermal load thereby determined is compared to a limiting load in method step 502; if the limiting load is higher than the instantaneous thermal load which was determined, then in method step 503, the emission may be reduced by influencing the rise and fall times. If this is not the case, then in method step 504, it is checked whether the thermal load is able to be reduced by selecting steeper edges. This may be done if the emission is not yet too high. The thermal load is reduced in method step 505. However, if this is not the case either, then the method according to the present invention is ended in method step 506.

What is claimed is:

1. A control unit for controlling a passenger-protection arrangement for a vehicle, comprising:
    at least one switching converter for converting voltage, wherein the at least one switching converter is disposed on an integrated circuit;
    a modifying circuit for the at least one switching converter, the modifying circuit determining a thermal load of the integrated circuit as a function of at least one physical parameter in respect to the integrated circuit, and modifying at least one of a rise time and a fall time of at least one output signal of the switching converter as a function of the thermal load;
    wherein at least one of shorter rise times shorter fall times are selected if the thermal load is above a given threshold for the thermal load.

2. The control unit of claim 1, wherein the modifying circuit is disposed at least partially on the integrated circuit.

3. The control unit of claim 1, wherein a processor in the control unit is at least one part of the modifying circuit.

4. The control unit of claim 1, wherein the at least one physical parameter is at least one of (i) an input voltage of at least one of the at least one switching converter and a switching-converter current, and (ii) a temperature of the integrated circuit.

5. A control unit for controlling a passenger-protection arrangement for a vehicle, comprising:
    at least one switching converter for converting voltage, wherein the at least one switching converter is disposed on an integrated circuit;
    a modifying circuit for the at least one switching converter, the modifying circuit determining a thermal load of the integrated circuit as a function of at least one physical parameter in respect to the integrated circuit, and modifying at least one of a rise time and a fall time of at least one output signal of the switching converter as a function of the thermal load;
    wherein the at least one switching converter has at least one switching transistor which is driven by a push/pull-gate-driver circuit, the push/pull-gate-driver circuit having a first adjustable current source for a fall time of a switching-transistor voltage and a second controllable current source for a rise time of the switching-transistor voltage.

6. A control unit for controlling a passenger-protection arrangement for a vehicle, comprising:
    at least one switching converter for converting voltage, wherein the at least one switching converter is disposed on an integrated circuit;
    a modifying circuit for the at least one switching converter, the modifying circuit determining a thermal load of the integrated circuit as a function of at least one physical parameter in respect to the integrated circuit, and modifying at least one of a rise time and a fall time of at least one output signal of the switching converter as a function of the thermal load;
    wherein the at least one switching converter has at least one switching transistor which is driven by a push/pull-gate-driver circuit, the push/pull-gate-driver circuit having quantized push transistors for the fall time of the drain source or collector-emitter switching-transistor voltage and quantized pull transistors for the rise time of the drain source or collector-emitter switching-transistor voltage.

7. A method for controlling a passenger-protection arrangement for a vehicle, the method comprising:
    using at least one switching converter to convert a voltage;
    determining, using a modifying circuit for the at least one switching converter, which is disposed on an integrated circuit, in a control unit (SG), a thermal load of the integrated circuit as a function of at least one physical parameter; and
    modifying at least one of a rise time and a fall time of at least one output signal of the at least one switching converter as a function of the thermal load;
    wherein at least one of shorter rise times shorter fall times are selected if the thermal load is above a given threshold for the thermal load.

8. The method of claim 7, wherein at least one of (i) an input voltage of the at least one switching converter, (ii) a switching-converter current, and (iii) a temperature of the integrated circuit is used as the at least one physical parameter.

9. The method of claim 7, wherein the modifying circuit is disposed at least partially on the integrated circuit.

10. The method of claim 7, wherein a processor in the control unit is at least one part of the modifying circuit.

11. The method of claim 7, wherein the at least one physical parameter is at least one of (i) an input voltage of at least one of the at least one switching converter and a switching-converter current, and (ii) a temperature of the integrated circuit.

12. A method for controlling a passenger-protection arrangement for a vehicle, the method comprising:
    using at least one switching converter to convert a voltage;
    determining, using a modifying circuit for the at least one switching converter, which is disposed on an integrated circuit, in the control unit (SG), a thermal load of the integrated circuit as a function of at least one physical parameter; and
    modifying at least one of a rise time and a fall time of at least one output signal of the at least one switching converter as a function of the thermal load;
    wherein the at least one switching converter has at least one switching transistor which is driven by a push/pull-gate-driver circuit, the push/pull-gate-driver circuit having a first adjustable current source for a fall time of a switching-transistor voltage and a second controllable current source for a rise time of the switching-transistor voltage.

13. A method for controlling a passenger-protection arrangement for a vehicle, the method comprising:
    using at least one switching converter to convert a voltage;
    determining, using a modifying circuit for the at least one switching converter, which is disposed on an integrated circuit, in the control unit (SG), a thermal load of the integrated circuit as a function of at least one physical parameter; and
    modifying at least one of a rise time and a fall time of at least one output signal of the at least one switching converter as a function of the thermal load;
    wherein the at least one switching converter has at least one switching transistor which is driven by a push/pull-gate-driver circuit, the push/pull-gate-driver circuit having quantized push transistors for the fall time of the drain source or collector-emitter switching-transistor voltage and quantized pull transistors for the rise time of the drain source or collector-emitter switching-transistor voltage.

* * * * *

UNITED STATES PATENT AND TRADEMARK OFFICE
CERTIFICATE OF CORRECTION

PATENT NO.       : 8,525,367 B2                                Page 1 of 1
APPLICATION NO. : 12/811320
DATED            : September 3, 2013
INVENTOR(S)      : Sievers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 114 days.

Signed and Sealed this
Fifteenth Day of September, 2015

Michelle K. Lee
*Director of the United States Patent and Trademark Office*